United States Patent [19]

Adelmann et al.

[11] 4,221,645

[45] Sep. 9, 1980

[54] POLYCARBONATES WITH END GROUPS CONTAINING DOUBLE BONDS WHICH CAN BE CROSSLINKED BY UV LIGHT

[75] Inventors: Siegfried Adelmann; Dieter Margotte; Hans J. Rosenkranz; Hugo Vernaleken; Werner Nouvertné; Dieter Freitag, all of Krefeld, Fed. Rep. of Germany

[73] Assignee: Bayer Aktiengesellschaft, Leverkusen, Fed. Rep. of Germany

[21] Appl. No.: 50,899

[22] Filed: Jun. 21, 1979

[30] Foreign Application Priority Data

Jul. 4, 1978 [DE] Fed. Rep. of Germany ....... 2829256

[51] Int. Cl.² .................................................. C08F 8/00
[52] U.S. Cl. .......................... 204/159.14; 204/159.18; 204/159.19; 528/125; 528/126; 528/128; 260/37 PC
[58] Field of Search ................ 528/128, 125, 126; 204/159.14, 159.19, 159.18; 260/37 PC

[56] References Cited

U.S. PATENT DOCUMENTS

| | | | |
|---|---|---|---|
| 2,838,474 | 6/1958 | Mels et al. ............................ | 260/62 |
| 3,124,555 | 3/1964 | Bown et al. .......................... | 260/45.5 |
| 3,150,066 | 9/1964 | Schnell et al. ................... | 204/159.14 |
| 3,453,237 | 7/1969 | Borden et al. ...................... | 260/47 |
| 3,475,373 | 10/1969 | Jackson et al. ........................ | 260/47 |
| 3,518,175 | 6/1970 | Bell ................................... | 204/159.19 |
| 3,600,288 | 8/1971 | Viventi ............................. | 204/159.13 |
| 3,622,331 | 11/1971 | Thomas ................................ | 96/68 |
| 3,775,367 | 11/1973 | Nouvertne ...................... | 260/45.9 R |
| 3,787,302 | 1/1974 | Ijichi et al. ......................... | 204/159.2 |
| 3,789,052 | 1/1974 | Klebe et al. ................. | 204/159.14 X |
| 3,892,889 | 7/1975 | Cohnen et al. ........................ | 427/160 |
| 3,912,687 | 10/1975 | Haupt et al. ..................... | 260/47 XA |
| 3,992,276 | 11/1976 | Powanda et al. ................ | 204/159.16 |
| 4,028,204 | 6/1977 | Rosen et al. ..................... | 204/159.14 |
| 4,101,399 | 7/1978 | Costanza et al. ................ | 204/159.19 |
| 4,129,612 | 12/1978 | Serini et al. ....................... | 428/412 X |

FOREIGN PATENT DOCUMENTS 1085668 7/1960 Fed. Rep. of Germany .
1099732 8/1961 Fed. Rep. of Germany .
2401630 8/1974 Fed. Rep. of Germany .
1397919 6/1975 United Kingdom .

Primary Examiner—Richard B. Turer
Attorney, Agent, or Firm—Gene Harsh; Lawrence S. Pope

[57] ABSTRACT

High molecular weight aromatic polycarbonates having molecular weights $\overline{M}_w$ (weight average) of between about 10,000 and 200,000, which are based on diphenols and monofunctional chain stoppers, which correspond to the general formula

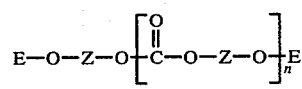

(I)

in which
Z denotes the radical of a diphenol,
n denotes an integer from 20 to 400,
E denotes

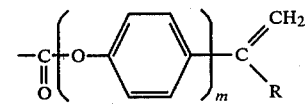

m is 0 or 1 and
R denotes a hydrogen atom or a $C_1$ to $C_3$ alkyl group, and in which between about 0.5 and 5 mol % of Z are radicals of aromatic dihydroxyketones. These polycarbonates share mechanical and thermal properties with known polycarbonates but in addition are suitable for crosslinking, for example in the presence of photoinitiators and optionally photo-reducing agents and under irradiation with UV light. When crosslinked they are resistant to organic solvents and insensitive to stress-cracking, and have particularly good flame-repellent properties when additionally incorporating flameproofing agents.

14 Claims, No Drawings

POLYCARBONATES WITH END GROUPS CONTAINING DOUBLE BONDS WHICH CAN BE CROSSLINKED BY UV LIGHT

SUMMARY OF THE INVENTION

The present invention relates to new high-molecular crosslinkable polycarbonates having molecular weights $\overline{M}_w$ (weight average) between about 10,000 and 200,000, preferably between about 20,000 and 80,000, which are based on diphenols and monofunctional chain stoppers, characterized in that they correspond to the formula (I)

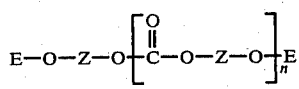

in which
Z is the radical of a diphenol,
n is an integer between about 20 and 400, and

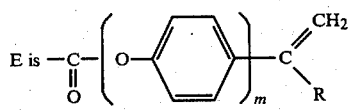

wherein
m denotes 0 or 1 and
R denotes H or $C_1$-$C_3$-alkyl,
characterized in that between about 0.5 and 5 mol % of Z are radicals of aromatic dihydroxyketones.

The present invention also relates to a process for the preparation of new high-molecular polycarbonates having a $\overline{M}_w$ of between about 10,000 and 200,000, preferably between about 20,000 and 80,000, which is characterized in that diphenols of the formula (II)

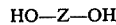

wherein
Z is a divalent aromatic radical which can be optionally alkyl-substituted or halogen-substituted and which preferably contains about 6 to 30 C atoms, and/or their chlorocarbonic acid esters are reacted, in accordance with the processes which are customary for the preparation of polycarbonates, in a homogeneous or heterogeneous phase system, using about 0.05 to 5 mol %, preferably about 0.1 and 4 mol %, relative to mols of structural units Z employed, of compounds of the formula (III)

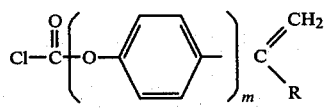

as a chain stopper,
wherein
m and R have the meaning indicated for formula (I), and between about 0.5 and 5 mol % of the diphenols of the formula (II) are aromatic dihydroxyketones.

In addition to the chain stoppers of the formula (III) to be used according to the invention, all the customary monofunctional phenols which are suitable for the synthesis of polycarbonates can also be co-used.

The crosslinkable polycarbonates according to the invention contain, in amounts of about 0.5 to 5 mol %, relative to mols of all the diphenols of the formula HO—Z—OH (II) employed, co-condensed aromatic dihydroxyketones, preferably those of the following formulae (IIa), (IIb) and/or (IIc):

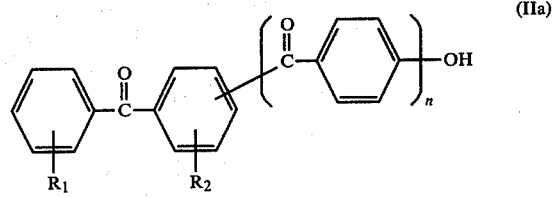

in (IIa),
$R_1$ or $R_2$ is OH,
n is zero or 1 and
$R_1$ and $R_2$ can be either OH or H.

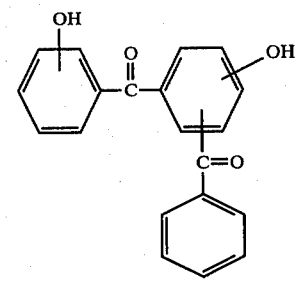

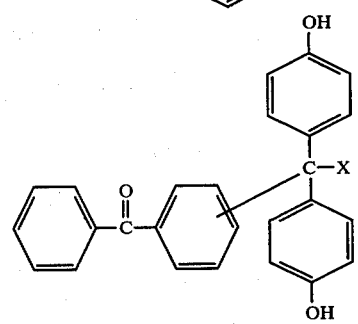

in (IIc),
X can be a $C_1$-$C_6$-alkyl or phenyl.

Polycarbonates are known and, because of their outstanding properties, have found use in many fields of application. However, their resistance to organic solvents and to stress-cracking, for example, is inadequate for specific applications.

The mechanical or thermal properties of the polycarbonates according to the invention do not deviate from those of the polycarbonates which are customarily terminated only with phenol, p-tert.-butylphenol or 2,6-dimethylphenol. In addition, they are suitable for crosslinking, for example under irradiation with UV light, and thus are resistant to organic solvents and insensitive to stress-cracking, and make it possible to prepare polycarbonates with particularly good flame-repellent properties, optionally additionally using flameproofing agents.

The present invention thus also relates to a process for the modification of polycarbonates, which is characterized in that the polycarbonates or polycarbonate mixtures of the formula (I), according to the invention, are irradiated with UV light, optionally after adding flameproofing agents in amounts of about 0.05 to 5% by weight, preferably about 0.1 to 2% by weight, relative to the weight of polycarbonate.

The present invention also relates to modified polycarbonates which are obtainable by the abovementioned process.

The monomers employed for chain-stopping are inexpensive and readily available commercially and can be incorporated without difficulty into the polymer by the processes which are customary for the preparation of polycarbonates, so that polycarbonates which can readily be crosslinked by UV light can be prepared under economic conditions.

DETAILED DESCRIPTION OF THE INVENTION

Examples of suitable diphenols of the formula (II), which preferably contain about 6 to 30 C atoms, are: hydroquinone, resorcinol, dihydroxydiphenyls, bis-(hydroxyphenyl)-alkanes, bis-(hydroxyphenyl)-cycloalkanes, bis-(hydroxyphenyl) sulphides, bis-(hydroxyphenyl) ethers, bis-(hydroxyphenyl) sulphoxides, bis-(hydroxyphenyl) sulphones, $\alpha,\alpha'$-bis-(hydroxyphenyl)-diisopropylbenzenes and nuclear-alkylated and nuclear-halogenated compounds thereof.

These and further suitable diphenols are described, for example, in U.S. Pat. Nos. 3,028,365; 2,999,835; 3,148,172; 3,271,368; 2,991,273; 3,271,367; 3,280,078; 3,014,891 and 2,999,846; German Published Patent Specifications 1,570,703; 2,063,050; 2,063,052; 2,211,956 and 2,211,957; French Patent 1,561,518 and in the monograph "H. Schnell, Chemistry and Physics of Polycarbonates," Interscience Publishers, New York 1964.

Examples of preferred diphenols are: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Examples of aromatic dihydroxyketones which can be employed according to the invention are 4,4'-dihydroxybenzophenone, 2,4-dihydroxybenzophenone and 4-($\alpha,\alpha$-bis-(4-hydroxyphenyl)-ethyl)-benzophenone.

Examples of compounds of the formula (III) which are suitable according to the invention are: acryloyl chloride, methacryloyl chloride, isopropenylphenyl chlorocarbonate and p-hydroxystyrene chlorocarbonate.

It is also possible to use any desired mixtures of the diphenols of the formula (II), together with the dihydroxyketones (IIa), (IIb) and/or (IIc).

The polycarbonates can be branched by incorporating small amounts, preferably amounts between about 0.05 and 2.0 mol % (relative to diphenols incorporated), of compounds which are trifunctional or more than trifunctional, in particular those with three or more than three phenolic hydroxyl groups.

Polycarbonates of this type are described, for example, in German Published Patent Specifications 1,570,533; 1,595,762; 2,116,974; 2,500,092 and 2,113,347; British Pat. No. 1,079,821 and U.S. Pat. No. 3,544,514.

The preparation of the polycarbonates according to the invention can essentially be carried out by the following two known processes (compare H. Schnell, "Chemistry and Physics of Polycarbonates," Polymer Rev., Volume IX, page 27 et seq., Interscience Publishers), which are briefly described in the following text.

1. Preparation of an aromatic polycarbonate in a heterogeneous phase system (phase boundary process):

In this process, the diphenols of the formula (II), together with the dihydroxyketones (IIa), (IIb) and/or (IIc), are dissolved in an aqueous alkaline phase. The chain regulators of the formula (III) required for the preparation of the polycarbonates according to the invention are added to this alkaline phase, dissolved in an organic solvent or in bulk. After adding a solvent suitable for the polycarbonate, a two-phase mixture is formed, into which phosgene is passed at 0° to 60° C. After adding a catalyst, high-molecular polycarbonates are obtained. The mixture is worked up by washing the organic phase and then distilling off the solvent, for example in devolatilization extruders at temperatures of 280° to 330° C.

Suitable organic solvents for polycarbonates and for the compounds of the formula (III) are those which are known for the synthesis of polycarbonates, such as, for example, methylene chloride, chlorobenzene and mixtures thereof.

Suitable catalysts are those which are known for the synthesis of polycarbonates, such as, for example, triethylamine and tributylamine.

2. Preparation of a polycarbonate in a homogeneous phase system (pyridine process):

The diphenols of the general formula (II), together with the dihydroxyketones (IIa), (IIb) and/or (IIc), and the chain regulators of the general formula (III) are dissolved in an organic base, such as, for example, pyridine. After adding a solvent suitable for the polycarbonate, phosgene is passed in at temperatures between 0° and 60° C.

The pyridine hydrochloride which is formed during the reaction is filtered off and the organic phase is washed with dilute HCl and then with water until neutral. Working up is likewise carried out as described under (1), for example by evaporating off the solvent in a devolatilization screw.

In addition to pyridine, examples of suitable organic bases are triethylamine and tributylamine. Methylene chloride and chlorobenzene and mixtures thereof can be used as solvents for the polycarbonate.

If, in addition to, or instead of, the diphenols of the formula (II) their chlorocarbonic acid esters are employed, the amounts of chain stoppers necessary for the processes under (1) and (2) are accordingly calculated from the structural units Z, resulting from the sum of all the diphenols employed, including the dihydroxyketones and their chlorocarbonic acid esters.

The UV irradiation required for the modification of the polycarbonates according to the invention is effected with UV light using commercially available UV lamps, for example Philips HTQ 4 or 7, Hanovia lamps and others. Sources of other high-energy rays, for example electron beams, can also be used. The irradiation time is between about 20 and 180 seconds, depending on the content of photoinitiators employed and depending on the nature of the sample.

Examples of flameproofing agents which are suitable for the modification of the polycarbonates according to the invention are the compounds which are known and suitable for rendering polycarbonates flame-resistant, and substances having a synergistic action, such as are described in German Published Patent Specifications Nos. 1,930,257; 2,049,358; 2,112,987; 2,253,072 and other literature sources.

Examples of suitable compounds are alkali metal salts, in particular those which are soluble in polycarbonate, such as, for example, potassium isooctanate, sodium isooctanate, lithium isooctanate, potassium perfluorooctanate, sodium perfluorooctanate, lithium perfluorooctanate, potassium salts of 5-ethyl-dioxan-1,3-yl-5-carboxylic acid, rubidium isooctanate, rubidium perfluorooctanate and the alkali metal salts of perfluoroalkanesulphonic acid, such as potassium perfluoromethanesulphonate, potassium perfluorooctanesulphonate and potassium perfluorobutanesulphonate. Alkali metal salts of lauric acid, stearic acid, oleic acid, phthalic acid monobenzyl ester, adipic acid monobutyl ester, p-octylbenzoic acid, p-tert.-butylbenzoic acid, 3-(3,5-di-tert.-butyl-4-hydroxyphenyl)-propionic acid and of diglycollic acid monodecyl ester can also be used.

The incorporation of the flameproofing agents into the polycarbonates according to the invention and the molding of the crosslinkable polycarbonates takes place before irradiation thereof.

The polycarbonates according to the invention can be irradiated either as films, sheets or as granules or as other shaped articles.

The modified polycarbonate molding compositions obtainable according to the invention are resistant to organic solvents and, compared with conventional polycarbonates, are distinguished by an improved resistance to stress-cracking. If flameproofing agents have also been added to them, products which are evaluated with VO according to UL Subj. 94 are obtained, even in the case of small additions.

The modified polycarbonates obtainable according to the invention can be employed as films and shaped articles in all cases where high resistance to organic solvents, coupled with high resistance to stress-cracking, is required.

The examples which follow are intended to illustrate the subject of the invention in more detail. The relative viscosities indicated were measured in methylene chloride at 25° C. and at a concentration of 5 g/l.

EXAMPLES

EXAMPLE 1 (Comparison Example)

About 454 parts of 4,4'-dihydroxydiphenyl-2,2-propane and 9.5 parts of p-tert.-butylphenol are suspended in 1.5 l of water. The oxygen is removed from the reaction mixture in a 3-necked flask, provided with a stirrer and gas inlet tube, by passing nitrogen through the reaction mixture for 15 minutes, while stirring. 355 parts of 45% strength sodium hydroxide solution and 1,000 parts of methylene chloride are then added. The mixture is cooled to 25° C. While maintaining this temperature by cooling, 237 parts of phosgene are added over a period of 120 minutes.

An additional amount of 75 parts of a 45% strength sodium hydroxide solution is added after 15–30 minutes, or after the absorption of phosgene has started. 1.6 parts of triethylamine are added to the solution formed and the mixture is stirred for a further 15 minutes. A highly viscous solution is obtained, the viscosity of which is regulated by adding methylene chloride. The aqueous phase is separated off. The organic phase is washed with water until free from salts and alkali. The polycarbonate is isolated from the washed solution and dried. The polycarbonate has a relative viscosity of 1.29–1.30.

EXAMPLE 2

2,778 g (12.2 mols) of 4,4'-dihydroxydiphenyl-2,2-propane and 39.6 g (0.2 mol) of 4,4'-dihydroxybenzophenone are suspended in 19 l of water. The oxygen is removed from the reaction mixture in a kettle, provided with a stirrer and gas inlet tube, by passing nitrogen through the reaction mixture for 15 minutes, while stirring. 2,347 g (26.4 mols) of 45% strength sodium hydroxide solution and 27.4 l of methylene chloride are then added. The mixture is cooled to 25° C. and 33 g (0.32 mol) of methacryloyl chloride, dissolved in 0.5 l of methylene chloride, are added. While maintaining the above temperature by cooling, 1,554 g (15.6 mols) of phosgene are added over a period of 120 minutes. An additional amount of 1,260 g (14.2 mols) of 45% strength sodium hydroxide solution and 7.5 l of water are added after 15 minutes, or after the absorption of phosgene has started. 9 ml of concentrated triethylamine are added to the solution formed and the mixture is stirred for a further 15 minutes.

A highly viscous solution is obtained, the viscosity of which is regulated by adding methylene chloride. The aqueous phase is separated off.

The organic phase is washed with water until free from salts and alkali. The polycarbonate is isolated from the washed solution and dried. The polycarbonate has a relative viscosity of 1.310.

EXAMPLE 3

A polycarbonate with a relative viscosity of 1.295 is prepared by the process indicated in Example 2 from 2.212 kg (9.7 mols) of 4,4'-dihydroxyphenyl-2,2-propane, 97 g (0.25 mol) of 4-($\alpha$,-$\alpha$-bis-(4-hydroxy-phenyl)-ethyl)-benzophenone and 30 g (0.3 mol) of methacryloyl chloride.

The polycarbonates from Examples 1 to 3 are dissolved in methylene chloride and processed to films 100 $\mu$m thick and the films are dried overnight at 120° C. The films are then irradiated on both sides with a Philips HTQ 4 UV lamp (high-pressure mercury vapor lamp) at a distance of 15 cm for 45 and 180 seconds. The films are treated with methylene chloride and the crosslinked portions are filtered off as insoluble fibrils or pieces of film and, after drying, are determined gravimetrically. As a result of the different crosslinking of the polycarbonates from Examples 1 to 3, the films undergo different stress-cracking.

For the measurement, strips of film 1 cm wide and 100 $\mu$m thick are curved to form a loop with a radius of 3 cm and the loops are immersed in carbon tetrachloride. The time until the loop of film breaks as a result of stress-cracking occurring is recorded. The results are summarized in Table I.

TABLE I

| | Exposure time seconds | Insoluble portion % by weight | Stability in carbon tetrachloride seconds |
|---|---|---|---|
| Example 1 (Comparison Example) | 180 | — | 1 |
| Example 2 | 45 | 32 | 120 |
| | 180 | 75 | 180(+) |
| Example 3 | 45 | 35 | 130 |
| | 180 | 70 | 180(+) |

(+)The test was interrupted after 180 seconds.

EXAMPLE 4 (Comparison Example)

4,996 g of the polycarbonate from Example 1 are mixed together with 4 (0.1% by weight) of potassium perfluorobutanesulphonate at 300° C. in a twin-screw machine and the mixture is granulated.

EXAMPLE 5

4,996 g of the polycarbonate from Example 2 are mixed together with 4 g (0.1% by weight) of potassium perfluorobutanesulphonate at 300° C. in a twin-screw machine and the mixture is granulated.

EXAMPLE 6

4,996 g of the polycarbonate from Example 3 are mixed together with 4 g (0.1% by weight) of potassium perfluorobutanesulphonate at 300° C. in a twin-screw machine and the mixture is granulated.

The modified polycarbonates from Examples 4, 5 and 6 are injection-molded to give standard test bars and the bars are irradiated on both sides with a Philips HTQ 4 high-pressure mercury vapor lamp at a distance of 15 cm for 45 seconds. The fire risk classifications found are summarized in Table II.

TABLE II

| Burning properties according to | UL Subj. 94 | |
|---|---|---|
| | 1/8" | 1/16" |
| Example 4 (Comparison Example) | V2 | V2 |
| Example 5 | VO | VO |
| Example 6 | VO | VO |

It is to be understood that any of the components and conditions mentioned as suitable herein can be substituted for its counterpart in the foregoing examples and that although the invention has been described in considerable detail in the foregoing, such detail is solely for the purpose of illustration. Variation can be made in the invention by those skilled in the art without departing from the spirit and scope of the invention except as is set forth in the claims.

What is claimed is:

1. High-molecular weight aromatic polycarbonates having molecular weights $\overline{M}_w$ (weight average) between about 10,000 and 200,000 which are based on diphenols and monofunctional chain stoppers, characterized in that they correspond to the formula (I)

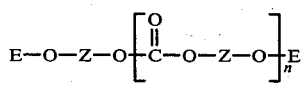
(I)

in which
Z denotes the radical of a diphenol,
n denotes an integer from about 20 to 400,
E denotes

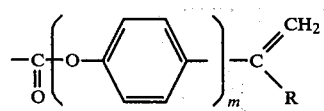

wherein
m denotes 0 or 1 and
R denotes H or $C_1$-$C_3$-alkyl, and in which between about 0.5 and 5 mol % of Z are radicals of aromatic dihydroxyketones.

2. The aromatic polycarbonate according to claim 1, having a molecular weight $M_w$ of between about 20,000 and 80,000.

3. A process for the preparation of the polycarbonates of claim 1, characterized in that diphenols of the formula (II)

$$HO-Z-OH \quad (II)$$

wherein
Z represents divalent aromatic radicals, their chlorocarbonic acid esters or mixtures thereof which are reacted, in a homogeneous or heterogeneous phase system, with components of the formula (III)

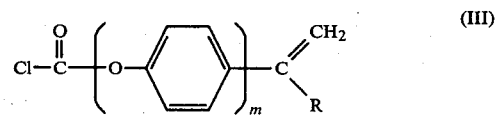
(III)

wherein
m denotes 0 or 1 and
R denotes H or $C_1$-$C_3$-alkyl, characterized in that between about 0.5 and 5 mol % of the diphenols of the formula (II) are aromatic dihydroxyketones.

4. The process of claim 3, wherein between about 0.5 and 5 mol %, relative to the mols of structural units Z, of compounds of the formula (III) are used.

5. The process of claim 3, wherein between about 0.1 and 4 mol %, relative to the mols of structural units Z, of compounds of the formula (III) are used.

6. The process of claim 3, wherein the aromatic dihydroxyketones are compounds of the general formulae

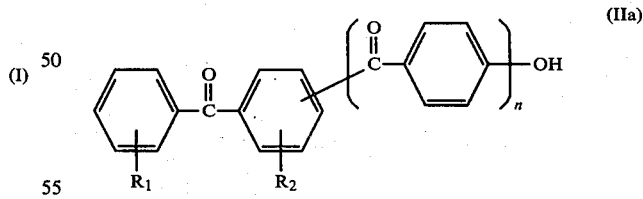
(IIa)

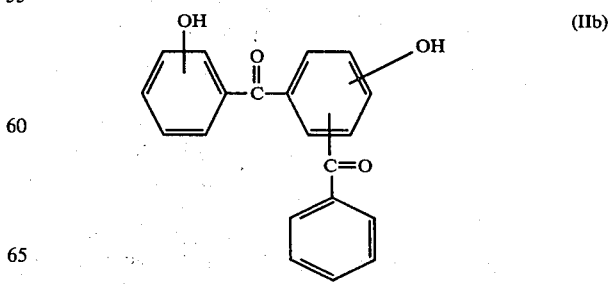
(IIb)

and/or

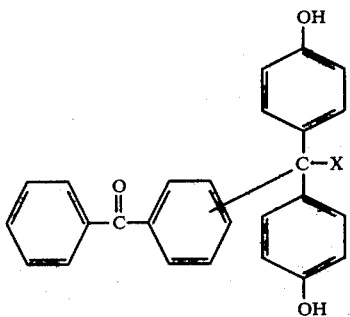 (IIc)

wherein
R₁ or R₂ is OH, and the other is H,
n denotes 0 or 1, and
X is a $C_1$-$C_6$-alkyl group or a phenyl radical.

7. The process of claim 6, wherein the aromatic dihydroxyketones are 4,4'-dihydroxybenzophenone, 2,4-dihydroxybenzophenone or 4-(α-α-bis-(4-hydroxyphenyl)-ethyl)-benzophenone.

8. The aromatic polycarbonates produced by the process of claim 3.

9. A process for the modification of a polycarbonate as claimed in claim 1, characterized in that the polycarbonate is irradiated with UV light.

10. The process of claim 9, wherein the polycarbonate is irradiated with UV light after adding a photoinitiator.

11. The process of claim 9, wherein a photoreducing agent is added to the polycarbonate prior to irradiation.

12. The process of claim 9, wherein between about 0.05 and 5% by weight, relative to the weight of polycarbonate, or a flameproofing agent is added to the polycarbonate prior to irradiation.

13. The modified polycarbonates produced by the process of claim 9.

14. The process of claim 12, wherein between about 0.1 and 2% by weight of flameproofing agent is used.

* * * * *